(12) United States Patent
Brown et al.

(10) Patent No.: US 7,448,831 B2
(45) Date of Patent: Nov. 11, 2008

(54) FLUIDISING MAT, CONTAINER AND CONTAINER LINER WITH SUCH A MAT

(75) Inventors: David Michael Brown, Whiternsea (GB); Michael Peter Douglas Massie, North Ferriby (GB)

(73) Assignee: Linertech Limited (GB)

( * ) Notice: Subject to any disclaimer, the term of this patent is extended or adjusted under 35 U.S.C. 154(b) by 25 days.

(21) Appl. No.: 10/564,489

(22) PCT Filed: Jul. 16, 2004

(86) PCT No.: PCT/GB2004/003087

§ 371 (c)(1),
(2), (4) Date: Sep. 18, 2006

(87) PCT Pub. No.: WO2005/014449

PCT Pub. Date: Feb. 17, 2005

(65) Prior Publication Data

US 2007/0009333 A1    Jan. 11, 2007

(30) Foreign Application Priority Data

Jul. 18, 2003    (GB)    ................... 0316864.8

(51) Int. Cl.
*B65G 53/18*    (2006.01)
(52) U.S. Cl. ........................... 406/90; 406/135
(58) Field of Classification Search ............ 406/86, 406/89, 90, 135, 138; 414/676
See application file for complete search history.

(56) References Cited

U.S. PATENT DOCUMENTS

| | | | | |
|---|---|---|---|---|
| 3,232,673 A | * | 2/1966 | Selig et al. ................ 406/89 |
| 3,917,354 A | * | 11/1975 | Adams, Jr. ................ 406/126 |
| 4,172,618 A | * | 10/1979 | Lambert .................... 406/90 |
| 4,413,758 A | * | 11/1983 | Walters ..................... 222/195 |
| 4,902,418 A | * | 2/1990 | Ziegler .................... 210/321.77 |
| 5,017,053 A | * | 5/1991 | Sisk ......................... 406/138 |
| 5,271,439 A | * | 12/1993 | Alack ........................ 141/65 |
| 5,547,331 A | * | 8/1996 | Podd et al. ................ 414/808 |
| 5,562,369 A | * | 10/1996 | Jones ......................... 406/90 |
| 5,603,566 A | * | 2/1997 | O'Ryan ..................... 366/107 |
| 6,170,976 B1 | * | 1/2001 | Sisk .......................... 366/101 |

(Continued)

FOREIGN PATENT DOCUMENTS

EP    1 371 581 A    5/1965

(Continued)

OTHER PUBLICATIONS

Inernational Search Report, PCT/GB2004/003087, mailed Oct. 11, 2004.

(Continued)

*Primary Examiner*—Douglas A Hess
(74) *Attorney, Agent, or Firm*—Brooks Kushman P.C.

(57) ABSTRACT

A fluidizing mat has an upper, micro-perforated sheet and a lower gas impermeable sheet. The upper and lower sheets are maintained in spaced apart superimposed relationship by a plurality of spaced-apart load bearing means, e.g. encapsulated air bubbles, which define a plurality of passageways that extend in different directions over substantially the full area of the fluidizing mat and intersect with each other to form a single continuous chamber between the upper and lower sheets.

25 Claims, 3 Drawing Sheets

U.S. PATENT DOCUMENTS

| | | | |
|---|---|---|---|
| 6,682,290 B2 * | 1/2004 | Pfeiffer et al. | 414/328 |
| 6,890,492 B1 * | 5/2005 | Turner et al. | 506/33 |
| 6,923,340 B2 * | 8/2005 | Ambs | 222/105 |
| 6,966,687 B1 * | 11/2005 | Elefsrud | 366/26 |
| 7,063,493 B2 * | 6/2006 | Pfeiffer et al. | 414/412 |
| 7,288,229 B2 * | 10/2007 | Turner et al. | 422/130 |

FOREIGN PATENT DOCUMENTS

| | | |
|---|---|---|
| GB | 885 525 A | 12/1961 |
| GB | 992 076 A | 5/1965 |
| GB | 994 634 A | 6/1965 |
| WO | WO 93/04954 A | 3/1993 |
| WO | WO 2005014449 A1 | 2/2005 |

OTHER PUBLICATIONS

Written Opinion of the International Searching Authority, PCT/GB2004/003087; filed Jul. 16, 2004.

* cited by examiner

FLUIDISING MAT, CONTAINER AND CONTAINER LINER WITH SUCH A MAT

BACKGROUND OF THE INVENTION

1. Field of the Invention

The present invention relates to container liners used for the transport of compactable, cohesive powders. More specifically the present invention relates to a device for fluidising powdered material contained within a container liner within a shipping container.

2. Background Art

There are many dry materials in fine particulate form which readily compact and bind together, showing a characteristically high angle of repose and difficult flow properties. Such powders commonly cause great difficulty on discharge from a shipping container, as they will not flow freely when the container is tipped, even at angles of 45° or more.

In order to facilitate the discharge of such materials from shipping and other storage containers it is known to fluidise the material by causing air to pass through it.

One known device for achieving fluidisation of powdered materials within a container liner comprises a fluidising mat which is placed within and at the bottom of the container liner prior to filling. The mat comprises two layers which are sealed along their edges and the uppermost of these two layers has micro-perforations in it Air under pressure is introduced between the two layers and passes through the micro-perforations in the upper layer to cause fluidisation of the powdered material contained within the liner.

Although this known device has succeeded to some degree in facilitating the discharge of fine particulate compactable powders from storage containers, there are a number of disadvantages which have prevented its widespread use. These disadvantages include:

a) The fact that the two flexible layers of the mat lie flat one on top of the other during loading, storage and transport. Given the weight of the cargo that lies on the mat in use, there is considerable resistance to the penetration of the injected gas between the layers, and hence to its even distribution under the cargo.

b) Many of the mats are divided into discrete sections or pockets in order to facilitate better control of the distribution of the injected gas. However, the ridges created between the pockets commonly trap material making discharge difficult. Moreover, the separation of the mat into discrete pockets also requires the use of a complex manifold to distribute the air under pressure to each of these pockets.

c) Material is commonly trapped between the edge of the fluidising mat and the container walls from where it is difficult to discharge. Attempts to overcome this problem by extending the fluidising mat up the sides of the container have met with limited success due to creasing problems and the higher initial cost of the mat.

d) When the discrete pockets of the fluidising mat are inflated they have a tendency to balloon. As the width of the pockets reduces the fluidising mat tends to pull away from the side walls of the container. This results in material being trapped down the sides of the fluidising mat from where it is difficult to discharge. To solve this problem it has been proposed to secure the fluidising mat along its edges to the liner and thereby maintain it at its full width, but this solution has proved complicated, expensive and not very effective.

e) The pervasive dusting which follows fluidisation by the high pressure air commonly used in this type of mat generally requires the provision of filtration equipment to reduce the egress of dust into the atmosphere.

WO-93/04954 discloses a fluidising mat which seeks to overcome at least some of these disadvantages. The mat is of rigid construction and comprises an upper non-flexible sheet and a lower non-flexible gas impermeable sheet held in spaced apart superimposed relationship by a plurality of rigid ribs which extend longitudinally between the upper and lower planar sheets to form an array of separate channels that extend substantially the full area of the mat. These channels are open at one end and closed at the other. Air is fed to each of the channels by a gas manifold which extends the full width of the mat to take in all the open ends of the channels. The upper planar sheet and the upper portion of the gas manifold have a plurality of micro-perforations therein.

The rigid structure of this fluidising mat has several advantages. Since the upper and lower layers of the mat are permanently held apart by the rigid ribs, the injected air is freely distributed and flows to all parts of the mat. Furthermore the gap between the upper and lower layers provides an effective plenum chamber which in turn ensures an even pressure distribution over the surface of the mat.

The rigid construction of this mat also prevents any ballooning of the mat with the resultant retraction from the walls of the container. Furthermore, it can eliminate the ridges between the sections of a flexible mat, since all parts of the mat can be of the same thickness.

A further advantage of this fluidising mat is that there is no need to inject high pressure air into the mat to lift the cargo and separate the upper and lower layers of the mat thereby allowing distribution of the air within the mat.

Although this fluidising mat provides means for facilitating the discharge of fine particulate compactable powders from storage containers, there are still a number of practical disadvantages which have limited its commercial use. These are:

a) The rigidity of the fluidising mat often necessitates that it be fitted at the time of fitting the liner. This in turn requires that fitters enter the liner through the hatches of the container. However, the possibility of ingress of contamination into the liner does in many cases make this totally unacceptable.

b) Commercial exploitation of the rigid mat has been further hampered by the high cost of this type of mat.

c) The size of the liner and fluidising mat together makes transport difficult, since the rigid mat cannot be folded down in size like the liner.

d) The design of the mat with separate longitudinally extending channels requires the use of a relatively complex manifold to connect the open end of each channel to the air supply.

SUMMARY OF THE INVENTION

It is an object of the present invention to resolve the problems associated with conventional fluidising mats referred to hereinabove by providing a low cost fluidising mat which can easily be transported and installed into a shipping container and which will allow such materials to be discharged completely and with minimal dusting.

It is another object of the present invention to provide a fluidising mat which can be formed as an integral part of a container liner.

It is still another object of the present invention to provide a fluidising mat which incorporates the advantages of a permanent plenum chamber and the attendant lower operating pressures and air volumes together with the flexibility to allow incorporation of the mat within a container liner at manufacture, and subsequent folding or rolling of the liner to allow a compact package for transport.

It is yet another object of the present invention to provide a fluidising mat which allows free distribution of air throughout the plenum chamber from a single entry point.

In accordance with a first aspect of the present invention, there is provided a fluidising mat comprising an upper, gas-permeable sheet and a lower gas impermeable sheet, the upper and lower sheets being maintained in spaced apart superimposed relationship by a plurality of spaced-apart load bearing means, which define a plurality of passageways that extend in different directions over substantially the fall area of the fluidising mat and intersect with each other to form a single continuous chamber between the upper and lower sheets.

The passageways defined by the load bearing means allow air to pass freely and ensure even pressure distribution throughout the fluidising mat. Consequently, it is not necessary to employ complex manifolds to distribute air under pressure around the fluidising mat.

The passageways may be partially defined by one of the upper and lower sheets. The passageways may define a continuous plenum chamber. In particular, the passageways, and the plenum chamber, may be partially defined by the upper, gas-permeable sheet.

Preferably, the upper sheet comprises a plurality of perforations, e.g. micro-perforations.

The air pressure required to fluidise the cargo is significantly lower with the fluidising mat of the present invention than it is with conventional fluidising mats. Consequently, there is little tendency for the fluidising mat to balloon or pillow. However, to safeguard against this the load bearing means is preferably secured to at least one of the upper and lower sheets. More preferably, each of the load bearing means is secured to at least one of the upper and/or lower sheets.

In one embodiment the load bearing means is secured to the lower sheet. In another embodiment, the load bearing means is secured to both the upper and lower sheets. However, it may be more convenient to provide point connections between the upper and lower sheets and the load bearing means at strategic locations through the fluidising mat.

The load bearing means are preferably flexible and/or resiliently deformable.

In one embodiment, the load bearing means comprises a plurality of spaced-apart encapsulated gas bubbles.

The mat may further comprise an intermediate sheet positioned between said upper and lower sheets, which encapsulates said gas bubbles. The lower sheet may partially encapsulate said gas bubbles. The lower sheet and the intermediate sheet may be formed integrally.

The load bearing means may be formed from bonded fibre structures, flexible open cell foams, sintered polymeric structures, foam beads, air bubbles formed from film, or three-dimensional structures formed from superimposed layers of net-like structures. All of the foregoing must be of sufficient compressive resistance to prevent crushing under the loads experienced in a loaded container.

The perforated upper layer may comprise an anti-static and/or electrically conductive material, materials, which combined with a liner made from a conductive material may be used in situations where there is a risk of dust explosion due to an electrostatic discharge.

Preferably, at least one of the upper and lower sheets and the load bearing means is flexible. Preferably, both of the upper and lower sheets are flexible.

A single point connection can be employed to connect the fluidising mat to a source of pressurised air or gas. This single point connection may be located anywhere in the perimeter of the fluidising mat. Conveniently, the single point connection is located in the perimeter of the fluidising mat adjacent to the discharge end of the container.

The fluidised mat may be situated anywhere on or in the liner, i.e. floor, roof and/or walls.

In accordance with a second aspect of the present invention the fluidising mat is an integral part of a container liner with the perforated upper sheet forming at least a part of the floor of the container liner. This embodiment has the advantage of making it unnecessary for an operative to enter the liner to fit the fluidising mat therein, with the consequent risk of contamination of the liner interior.

Where the fluidising mat is fitted within the liner it is desirable to provide retaining means to ensure that it does not move within the liner and is not discharged therefrom with the material when the container is tipped. Such retaining means are already known within the prior art.

To facilitate fluidisation of the contents of the container liner when full, the fluidising mat is situated at least in the region of the liner immediately adjacent to the discharge port or ports.

The present invention also includes a container comprising a fluidizing mat or comprising a container liner in accordance with the present invention.

Embodiments of the present invention will now be described, by way of example, with reference to the accompanying drawings, in which:

DETAILED DESCRIPTION OF THE PREFERRED EMBODIMENTS

Figure 1:
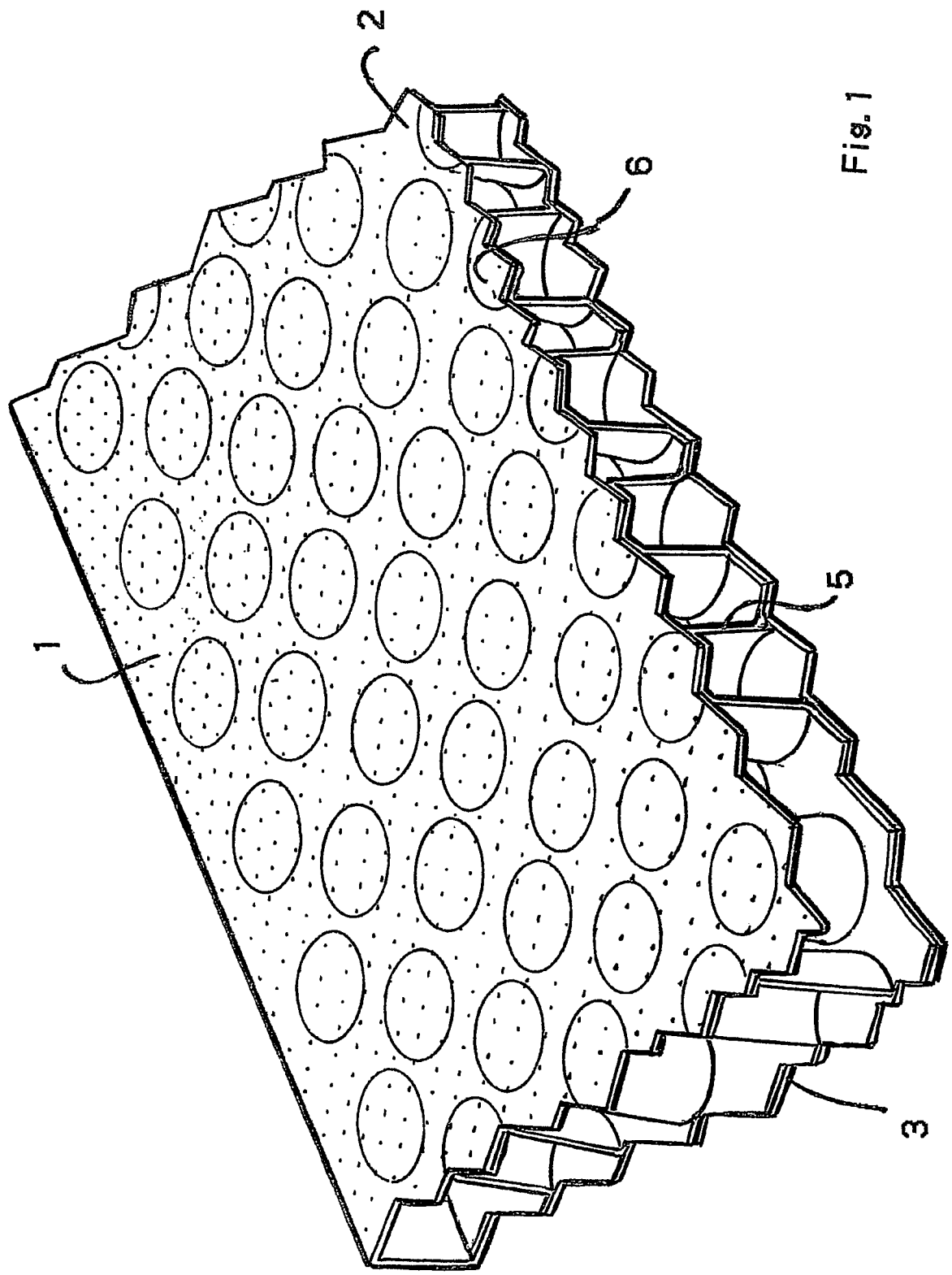
FIG. 1 is a partial cut away perspective view of a first embodiment of the fluidising mat of the invention.

Referring to FIG. 1 the fluidising mat comprises an upper, flexible sheet 2 of polyethylene or other polymeric material and a flexible gas impermeable lower sheet 3, also of polyethylene or other polymeric material. The upper sheet is rendered gas-permeable by the provision of micro-perforations 1 over the whole surface thereof. The micro-perforations are typically circular typically and of 0.1-0.2 mm diameter and are distributed at a density of typically 35,000 $m^{-1}$. However, the shape and/or density of the micro-perforations can be adjusted, depending upon the volume of fluidisation gas required for different cohesive powders. The micro-perforations are preferably formed by puncturing using an appropriate diameter needle or other sharp instrument and may conveniently be formed by using a piercing machine or device. However, the micro-perforations may be formed by other means, e.g. by means of a laser. In view of their small size, the micro-perforations are illustrated schematically in the Figures.

The upper and lower sheets 2 and 3 are maintained in spaced apart superimposed relationship by load bearing means 5 which takes the form of a plurality of sealed air bubbles formed by an intermediate sheet of flexible gas-impermeable film of polyethylene or other polymer bonded or welded to the lower sheet 3 to form an integral unit. The air bubbles 5 formed between the lower sheet 3 and the intermediate film are generally cylindrical, circular in horizontal cross-section and have a slightly domed top, having a diameter at the base of typically 12 mm and can be likened to typical known air cellular cushioning material (e.g. Bubble Wrap™ manufactured by Sealed Air Corporation). The sealed air bubbles provide a resiliently deformable and flexible load bearing means which, together with the flexibility of the upper and lower sheets 2 and 3, allows the mat to be rolled up or folded if desired. The size and/or shape of the air bubbles can differ from those described, depending upon the materials used for construction and the particular conditions in which the mat is intended to be used.

Between the load bearing air bubbles 5 numerous interconnected pathways (partly defined by the undersurface of the upper sheet 2) are formed, forming a continuous plenum chamber immediately beneath the upper sheet 3, such that gas or air injected between the upper and lower sheets at one point in the perimeter of the fluidising mat can pass freely and evenly throughout the entire area of the fluidising mat and out through the microperforations in the sheet 2. This is in marked contrast to the prior art, which requires the use of complex gas manifolds that allow air under pressure to be distributed to individual and separate pockets or channels in the fluidising mat.

The load bearing air bubbles 5 must be of sufficient compressive resistance to withstand crushing under the loads experienced in a loaded bulk cargo container. However, as a general rule these are not excessive.

Some or all of the load bearing air bubbles 5 may be bonded or otherwise attached to the upper sheet so as to prevent the sheet from forming a pillow or balloon as the fluidising mat is pressurised.

Referring to FIG. 2 the fluidising mat again comprises an upper sheet 2 having micro-perforations 1 throughout the surface thereof and a gas impermeable lower sheet 3, and once the upper and lower sheets 2 and 3 are maintained in spaced apart superimposed relationship by load bearing means 4. However, in this embodiment the load bearing means comprises a series of spaced-apart flexible and resiliently deformable blocks of an open cell foam structure or sintered granular structure. The spaces between the blocks form interconnected pathways extending in all directions throughout the area of the fluidising mat. This ensures the free and even distribution of air under pressure throughout the fluidising mat.

Figure 2:
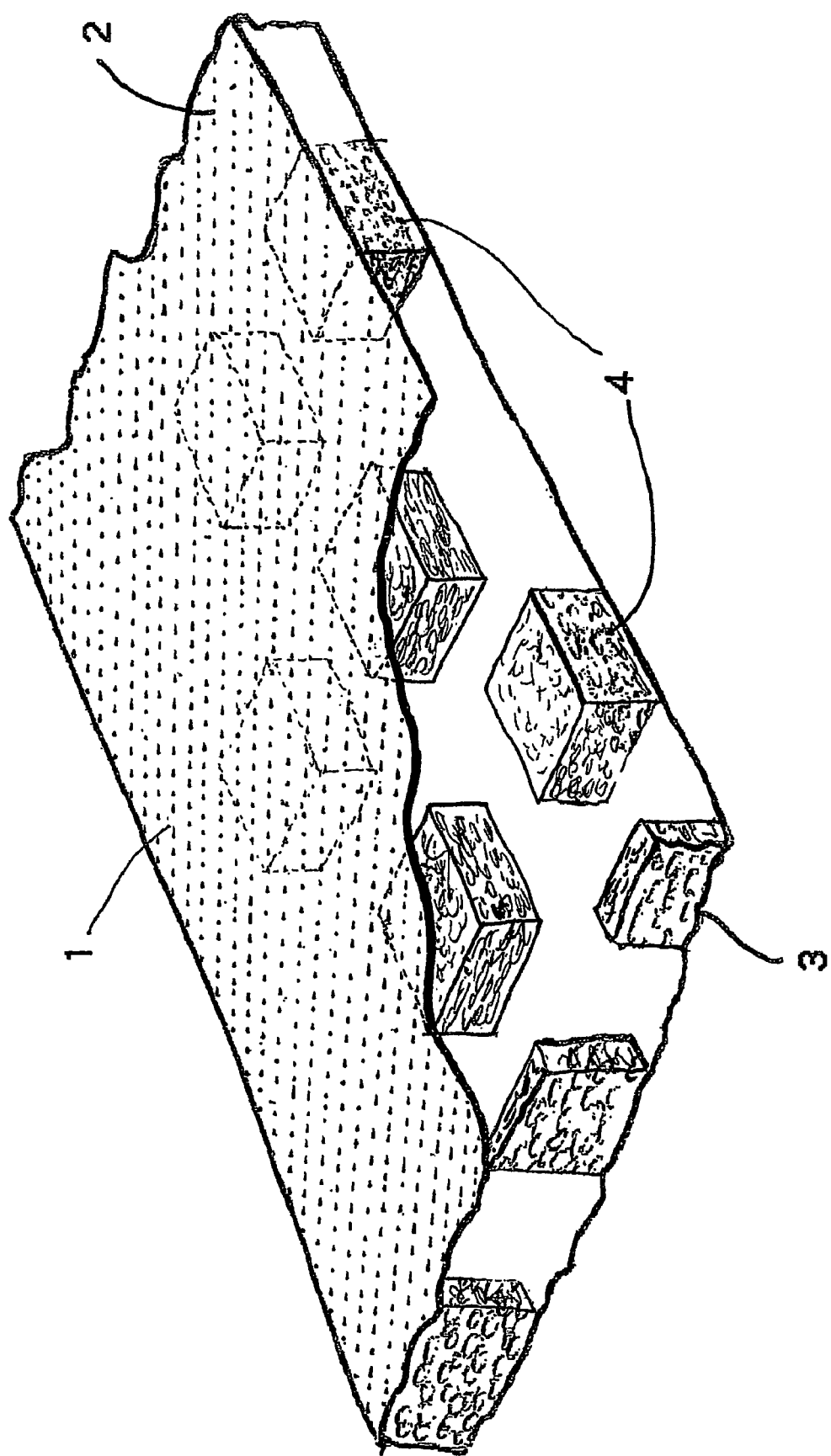
FIG. 2 is a partial cut away perspective view of a second embodiment of the fluidising mat of the invention.
Figure 3:
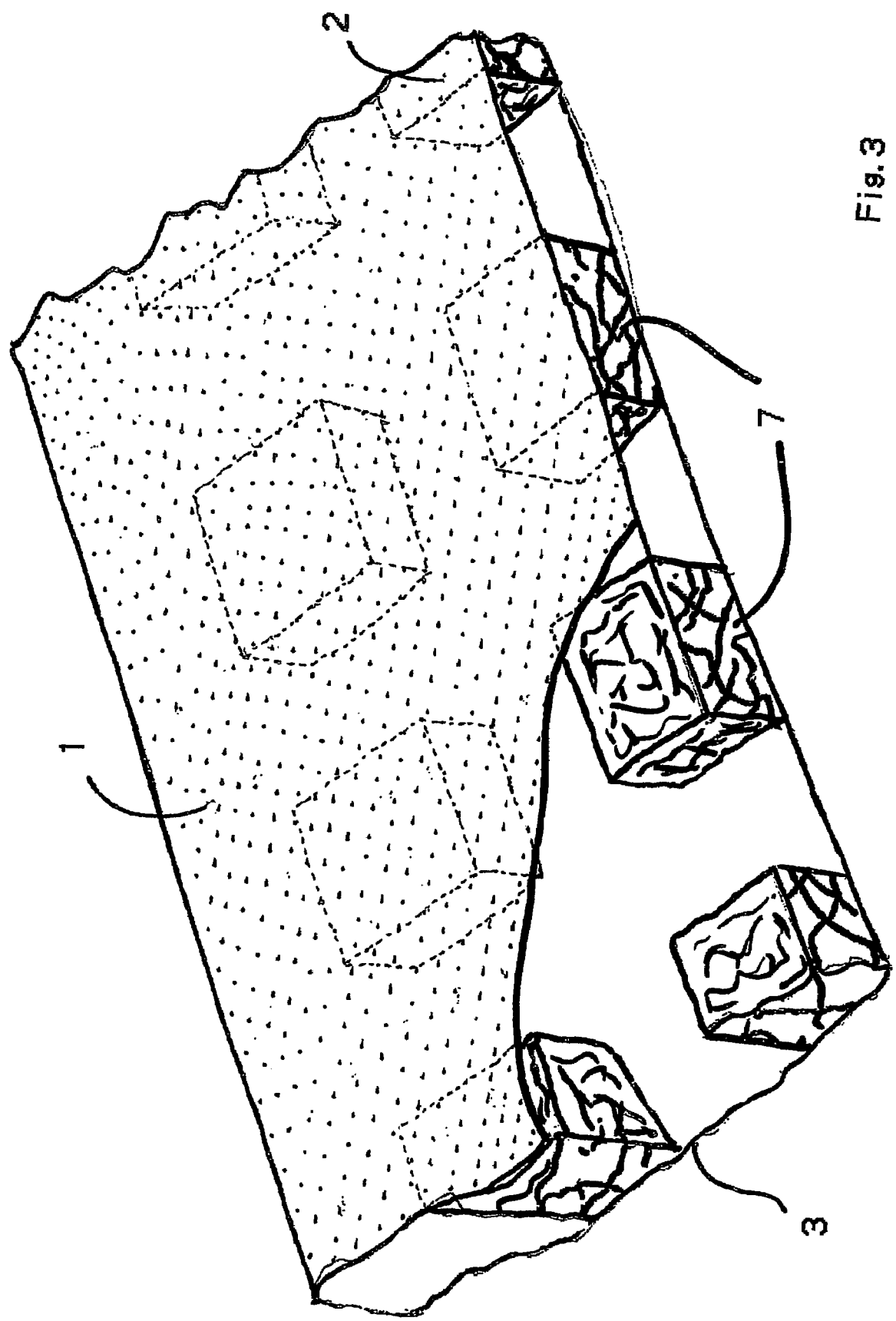
FIG. 3 is a partial cut away perspective view of a third embodiment of the fluidising mat of the invention.

The fluidising mat of FIG. 3 is essentially identical to that of FIGS. 1 and 2, except that in this embodiment the load bearing means provided between the upper and lower sheets takes the form of spaced-apart flexible and resiliently deformable blocks 7 of an interwoven filamentary structure, defining numerous pathways extending in all directions throughout the area of the fluidising mat, thus allowing air under pressure to be distributed freely and evenly throughout.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fluidising mat comprising an upper, gas-permeable sheet and a lower gas impermeable sheet, the upper and lower sheets being maintained in spaced apart superimposed relationship by a plurality of spaced-apart load bearing means, which define a plurality of passageways that extend in different directions over substantially the full area of the fluidising mat and intersect with each other to form a single continuous chamber between the upper and lower sheets, at least the upper sheet being flexible, at least some of the load bearing means comprising an encapsulated bubble.

2. A fluidising mat as claimed in claim 1, wherein the passageways are partially defined by one of the upper and lower sheets.

3. A fluidising mat as claimed in claim 2, wherein the plurality of passageways define a continuous plenum chamber.

4. A fluidising mat as claimed in claim 2, wherein the passageways are partially defined by the upper, gas-permeable sheet.

5. A fluidising mat as claimed in claim 1, wherein the upper sheet comprises a plurality of perforations, including microperforations.

6. A fluidising mat as claimed in claim 1, wherein a plurality of the load bearing means are secured to at least one of the upper and lower sheets.

7. A fluidising mat as claimed in claim 1, wherein each of the load bearing means is secured to, or forms an integral part of, at least one of the upper and/or lower sheets.

8. A fluidising mat as claimed in claim 7, wherein the load bearing means is secured only to the lower sheet.

9. A fluidising mat as claimed in claim 7, wherein the load bearing means is secured or bonded to both the upper and lower sheets.

10. A fluidising mat as claimed in claim 1, wherein the load bearing means are flexible and/or resiliently deformable.

11. A fluidising mat as claimed in claim 1, further comprising an intermediate sheet positioned between said upper and lower sheets, which encapsulates said gas bubbles.

12. A fluidising mat as claimed in claim 11, wherein the lower sheet partially encapsulates said gas bubbles.

13. A fluidising mat as claimed in claim 11, wherein the lower sheet and the intermediate sheet are formed integrally.

14. A fluidising mat as claimed in claim 1, wherein the load bearing means comprises a medium selected from the group consisting of a bonded fibre structure, a foam, a sintered polymeric structure, foam beads or a three-dimensional structure formed from superimposed layers of net-like structures, and combinations thereof.

15. A fluidising mat as claimed in claim 1, wherein the perforated upper layer comprises an anti-static and/or electrically conductive material.

16. A fluidising mat as claimed in claim 1, wherein the lower sheet is flexible.

17. A fluidising mat as claimed in claim 1, wherein both of the upper and lower sheets are flexible.

18. A fluidising mat as claimed in claim 1, further comprising a single point connection for connecting the fluidising mat to a source of pressurized air or gas.

19. A fluidising mat as claimed in claim 18, wherein the single point connection is located in the perimeter of the fluidising mat.

20. A fluidising mat as claimed in claim 19, wherein the single point connection is positioned on the mat such that, in use, it is adjacent to the discharge end of a container to which the mat is fitted.

21. A container liner comprising a fluidising mat, that includes an upper, gas-permeable sheet and a lower gas impermeable sheet, the upper and lower sheets being maintained in spaced apart superimposed relationship by a plurality of spaced-apart load bearing means which define a plurality of passageways that extend in different directions over substantially the full area of the fluidising mat and intersect with each other to form a single continuous chamber between the upper and lower sheets the upper sheet forming at least a part of the floor of the container liner.

22. A container liner as claimed in claim 21, further comprising retaining means for retaining the mat within the liner and for preventing discharge of the mat when the container is tipped.

23. A container liner as claimed in claim 21, wherein the fluidising mat is situated at least in the region of the liner immediately adjacent to a discharge port or ports.

24. A container comprising a fluidising mat that includes an upper, gas-permeable sheet and a lower gas impermeable sheet, the upper and lower sheets being maintained in spaced apart superimposed relationship by a plurality of spaced-apart load bearing means, which define a plurality of passageways that extend in different directions over substantially the full area of the fluidising mat and intersect with each other to form a single continuous chamber between the upper and lower sheets.

25. A container as claimed in claim 24, further including a container liner.

* * * * *